US008526436B2

(12) United States Patent  
Saeki

(10) Patent No.: US 8,526,436 B2
(45) Date of Patent: Sep. 3, 2013

(54) ADDRESS SEARCH METHOD AND PACKET PROCESSING DEVICE

(75) Inventor: Shuichi Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 12/920,151

(22) PCT Filed: Mar. 3, 2009

(86) PCT No.: PCT/JP2009/053922
§ 371 (c)(1),
(2), (4) Date: Aug. 30, 2010

(87) PCT Pub. No.: WO2009/110445
PCT Pub. Date: Sep. 11, 2009

(65) Prior Publication Data
US 2011/0002336 A1  Jan. 6, 2011

(30) Foreign Application Priority Data
Mar. 3, 2008  (JP) ................. 2008-051876

(51) Int. Cl.
*H04L 12/56* (2011.01)

(52) U.S. Cl.
USPC ........................................................ 370/392

(58) Field of Classification Search
USPC ............. 370/229, 230, 235, 241, 252, 351, 370/329, 392, 393, 412, 413, 415, 417, 419, 370/428–429, 389, 912
See application file for complete search history.

(56) References Cited

U.S. PATENT DOCUMENTS 5,400,338 A * 3/1995 Flammer, III ................. 370/255
5,920,900 A * 7/1999 Poole et al. .................... 711/216
6,807,411 B1 * 10/2004 De Kermadec ............ 455/412.1

FOREIGN PATENT DOCUMENTS

| JP | 60-211540 A | 10/1985 |
| JP | 2002334114 A | 11/2002 |
| JP | 2003324464 A | 11/2003 |
| JP | 2006352444 A | 12/2006 |
| WO | 2007066814 A | 6/2007 |

OTHER PUBLICATIONS

International Search Report for PCT/JP2009/053922 mailed Apr. 14, 2009.
D. E. Taylor, "Survey & Taxonomy of Packet Classification Techniques", 5.3 Hierarchical Intelligent Cuttings (Hi-Cuts), WUCSE-2004-24, May 10, 2004, pp. 1-42.

* cited by examiner

Primary Examiner — Omar Ghowrwal

(57) ABSTRACT

A packet processing device includes a first search table in which an entry including an index value and a destination address is registered and a second search table in which a combination of header information and a destination address is registered. The packet processing device receives as an input a combination of header information and a destination to be registered and calculates an index value by one-way function calculation using the input header information. If the calculated index value is different from the existing entry in the first search table, the calculated index value and the input destination are registered as a new entry in the first search table. If the calculated index value is the same as the index value of the existing entry, a combination of the header information and the destination address represented by the existing entry is registered together with a combination of the inputted header information and the destination address in the second search table, and the destination address of the existing entry is deleted. By using the header information of a transfer packet, the packet processing device searches the first and the second search tables in parallel for the destination of the packet.

12 Claims, 4 Drawing Sheets

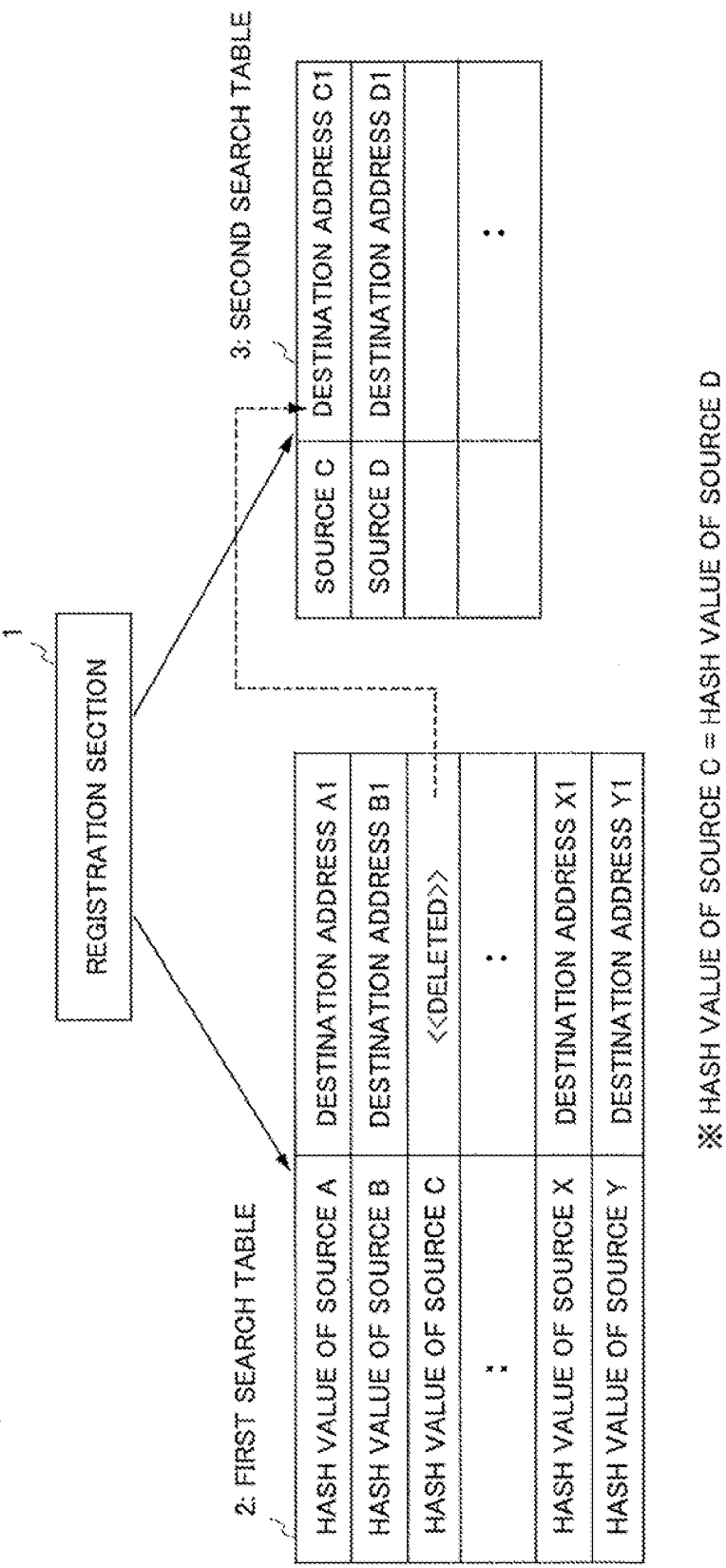

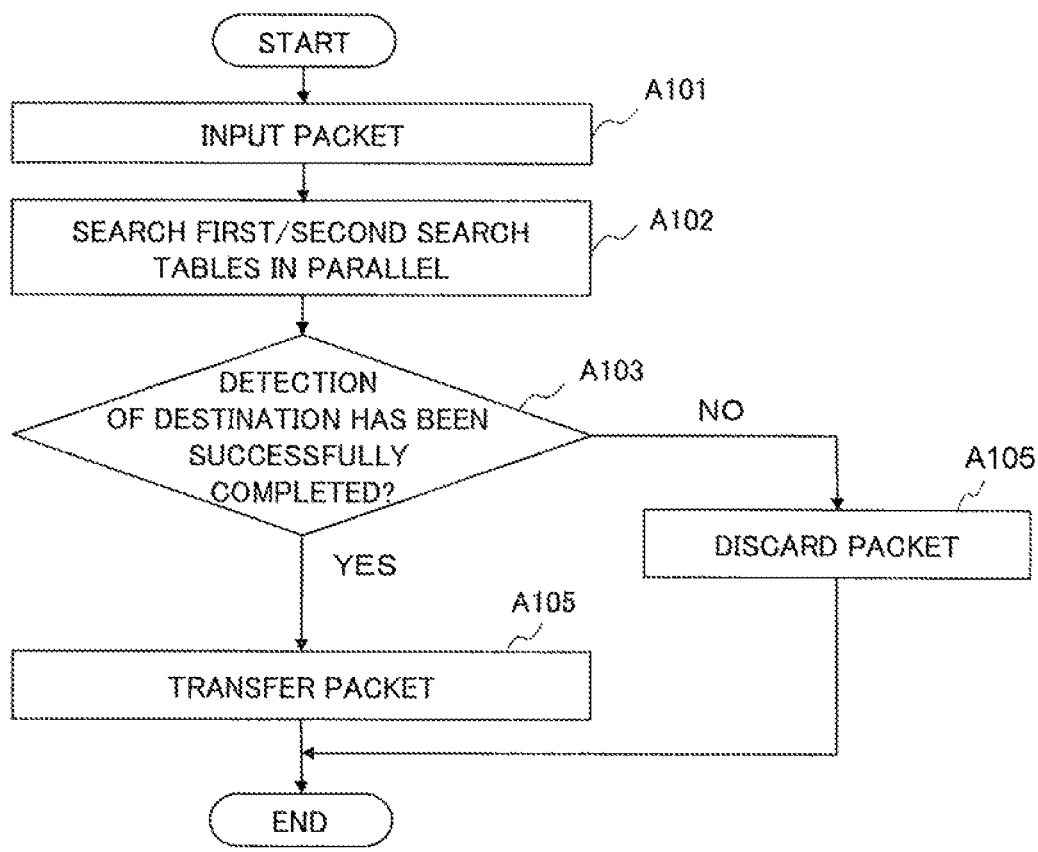

ADDRESS SEARCH METHOD AND PACKET PROCESSING DEVICE

This application is the National Phase of PCT/JP2009/053922, filed Mar. 3, 2009, which is based upon and claims the benefit of priority from the Japanese Patent Application No. 2008-051876, filed on Mar. 3, 2008, the disclosure of which is incorporated herein in its entirety by reference.

TECHNICAL FIELD

The present invention relates to a technique for searching for an address to be set in a packet.

BACKGROUND ART

As a technique relating to a mobile core network, a system that uses an SGSN (Serving GPRS (General Packet Radio Service) Support Node) and a GGSN (Gateway GPRS Support Node) as a device constituting a mobile core network can be exemplified. The SGSN is a node used for connecting to a radio access network. The GGSN is a node connected to an Internet service provider for Intent connection or a node connected to Intranet. The above system allows transmission/reception of packets to/from a mobile terminal through a base station on a mobile terminal network.

As a method concerning processing of a user plane packet transmitted in the above system, there is known a technique disclosed on, e.g., PTL 1. In the technique of PTL 1, the SGSN and GGSN each prepare an address table registering correspondence between an destination address and a transfer destination (SGSN) address, and the transfer destination of a packet is searched for using a destination set in the table as a key.

CITATION LIST

Patent Literature

{PTL 1} JP-A-2006-352444
{NPL 1} David E. Taylor "Survey & Taxonomy of Packet Classification Techniques" 5.3 Hierarchical Intelligent Cuttings (Hi-Cuts), May 10, 2004

SUMMARY OF INVENTION

Technical Problem

The address table search operation as performed in the technique disclosed in PTL 1 allows the transfer destination of a packet to be determined appropriately. However, in the case where a plurality of entries having the same search key (index) are registered in such a table, a plurality of candidates are detected by the search. In this case, in order to narrow down the candidates to one, it is necessary to perform additional processing, such as search of another table or narrow down search under a predetermined condition, causing an increased reduction in the throughput of a transfer node.

An object of the present invention is therefore to provide an address search method and a packet processing device for quickly searching for a destination address to be set in a transfer packet.

Solution to Problem

According to an aspect of the present invention, there is provided an address search method including: preparing a first search table in which an entry including an index value and a destination address is registered and a second search table in which a combination of header information and a destination address is registered; inputting a combination of header information and a destination address to be registered; calculating an index value by one-way function calculation using the input header information; registering, if the calculated index value is different from the index value of existing entry in the first search table, the calculated index value and the input destination address in the first search table as a new entry; registering, if the calculated index value is the same as the index value of the existing entry, a combination of the header information and the destination address represented by the existing entry together with a combination of the input header information and the destination address in the second search table and deleting the destination address of the existing entry; and searching, upon reception of a packet to be transferred, the first and the second search tables in parallel for the destination address of the packet by using the header information of the packet.

According to another aspect of the present invention, there is provided a packet processing device including: a first search table in which an entry including an index value and a destination address is registered; a second search table in which a combination of header information and a destination address is registered; a packet reception section that receives a packet to be transferred; a registration section that receives as an input a combination of header information and a destination address to be registered, calculates an index value by one-way function calculation using the input header information, registers the calculated index value and the input destination address in the first search table as a new entry if the calculated index value is different from the index value of existing entry in the first search table, and registers a combination of the header information and the destination address represented by the existing entry together with a combination of the input header information and the destination address in the second search table and deletes the destination address of the existing entry if the calculated index value is the same as the index value of the existing entry; and a search section that searches, upon reception of the packet to be transferred, the first and the second search tables in parallel for the destination address of the packet by using the header information of the packet.

Advantageous Effects of Invention

According to the present invention, it is possible to quickly search for a destination address to be set in a transfer packet.

BRIEF DESCRIPTION OF DRAWINGS

FIG. 3 An explanatory view concerning the address registration in the exemplary embodiment of the present invention.
FIG. 4 A flowchart concerning address search and packet transfer in the exemplary embodiment of the present invention.

DESCRIPTION OF EMBODIMENTS

Figure 1:
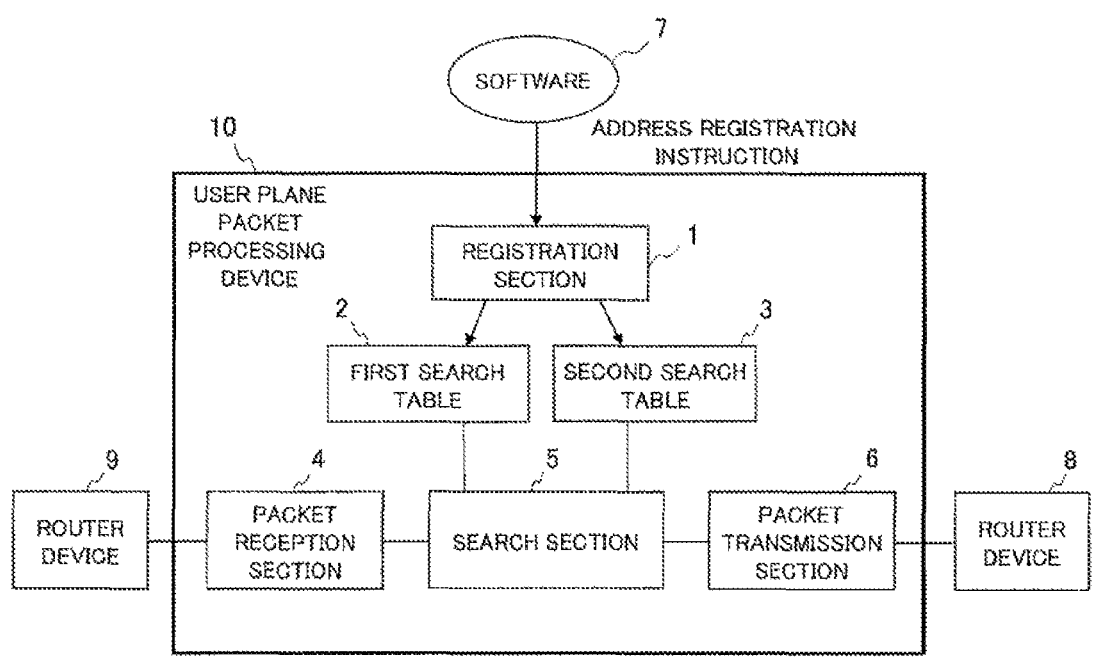
FIG. 1 A block diagram illustrating a configuration of an exemplary embodiment of the present invention.

FIG. 1 illustrates a configuration of an exemplary embodiment of the present invention. A packet processing device 10 is a device that processes a user plane packet according to an instruction from a control software 7 in the control plane. The packet processing device 10 includes a registration section 1, a first search table 2, a second search table 3, a packet reception section 4, a search section 5, and a packet transmission section 6. The packet processing device 10 is connected to a router device 8 and a router device 9.

The packet reception section 4 receives a packet from the router device 9, confirms the normality of the packet, and supplies the packet to the search section 5. The packet transmission section 6 transfers the packet that has been subjected to processing to be described later to the router device 8.

The registration section 1 performs registration processing of an address indicated by the control software 7 using the first search table 2 and the second search table 3. The details of the registration processing will be described later.

The first search table 2 and the second search table 3 are address tables for identifying a destination address from header information of the packet at the time of transferring the packet from the router device 9. The header information in the present exemplary embodiment is a source address described in the packet header. The destination address is an address of a node which is the packet arrival point. That is, the tables of the present exemplary embodiment are used for identifying the arrival point of a packet from a source address (starting point) of the packet.

A combination of an index value serving as a search key and a destination address is registered in the first search table 2 of the present exemplary embodiment. The index value of the present exemplary embodiment is a value (hereinafter, referred to as "hash value") obtained by performing hash function operation using the source address.

On the other hand, a combination of header information and a destination address is registered in the second search table 3. The second search table 3 of the present exemplary embodiment is constructed on a memory device including an associative memory (CAM: Content Addressable Memory), and search of the second search table 3 can be performed at higher speed than search of the first search table 2.

The search section 5 searches the first search table 2 and the second search table 3 using a source address of a packet received by the packet reception section 4 and sets the destination address obtained through the search to the transfer packet. The transfer packet is transferred to the router device 8 by the packet transmission section 6.

Figure 2:
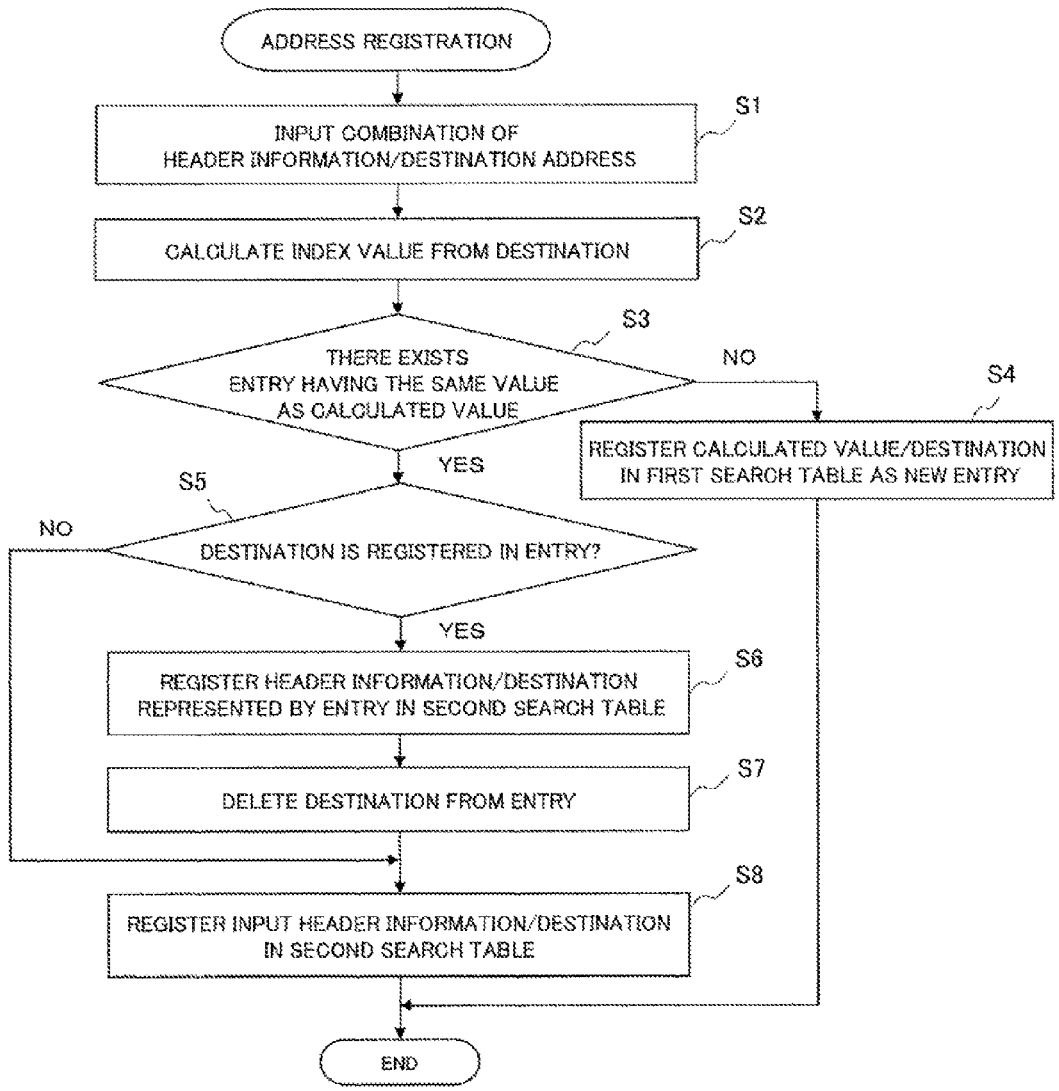
FIG. 2 A flowchart concerning address registration in the exemplary embodiment of the present invention.

An address registration procedure in the packet processing device 10 will be described along a flowchart illustrated in FIG. 2. The packet processing device 10 receives as an input a source address as header information registration of which is required by the control plane (7) and a destination address to be combined with the source address (step S1). Then, the packet processing device 10 calculates a hash value as the index value by using the input source address (step S2).

The packet processing device 10 confirms whether there exists or not the same value as the calculated hash value in the existing entries of the first search table 2, i.e., confirms presence/absence of a collision in a hash table. In the case where the calculated hash value does not collide with any of the existing entries (No in step S3), the packet processing device 10 registers a combination of the hash value and destination address in the first registration table 2 as a new entry (step S4).

On the other hand, in the case where the calculated hashed value collides with any of the existing entries (Yes in step S3), the packet processing device 10 confirms whether the destination address is registered in the existing entry that collides with the calculated hash value. The presence/absence of registration of the destination in the first search table 2 will be described later. In the case where the destination address is not registered in the existing entry (No in step S5), the packet processing device 10 registers a combination of the source address (header information) and destination address that have been input this time directly in the second search table 3 (step S8).

In the case where the destination address is registered in the existing entry (Yes in step S5), the packet processing device 10 registers a combination of the source address and destination address represented by the existing entry in the second search table 3 (step S6) and deletes the destination address from the existing entry (step S7). As a result, only the hash value of the index remains in the existing entry in the first search table 2.

Further, the packet processing device 10 registers a combination of the source address (header information) and destination address that have been input this time directly in the second search table 3 (step S8).

As described above, the entry having the same hash value is registered in the high-speed searchable second search table 3 in place of the first search table 2. As a result, it is possible to avoid a plurality of entries having the same index value from being registered in the first search table 2. The addresses eliminated from the first search table 2 are registered in the second search table 3 in the original state, i.e., in the form of a combination of the source address and destination address. The use of the CAM for the secondary search table 3 allows the destination address to be searched for at high speed from the source address.

With reference to FIG. 3, a concrete example of the above registration processing will be described. FIG. 3 illustrates a state where the registration section 1 performs address registration for the first search table 2 and the second search table 3. The format of each table (tables 2 and 3) is a conceptual one, and the actual table format is not limited to the illustrative example.

The first search table 2 of FIG. 3 registers entries each including the hash value of the index concerning, e.g., "source A" or "source B" and an destination address (A1 or B1) paired with the hash value. The destination address has been removed from the entry of "source C" in the same table, and only the hash value of the index remain therein. The entry of "source C" is an entry that has undergone the abovementioned collision.

On the other hand, the second search table 3 registers destination addresses (C1 and D1) concerning "source C" and "source D". The "destination address C1" is a destination address that has been removed from the entry of "source C" in the first search table 2 and registered in the second search table 3.

Registration of "source D" has been made after registration of "source C", and it is assumed in this example that the hash value of "source D" is the same as that of "source C". In this case, as illustrated in FIG. 3, the address of "source D" is registered not in the first search table 2 but in the second search table 3. In the case where the hash values are the same as in the case of "source C" and "source D", the destination addresses thereof are registered not in the first search table 2 but in the second search table 3.

The reason that the index (hash value) of "source C" that has undergone the collision is left in the first search table 2 is to perform control such that, when a new address of "source C" is registered, the new address is registered in the second search table 3. That is, the index of "source C" is left in the first search table 2 in order to prevent a new entry of "source C" from being registered in the first search table 2. As a result, even if an attempt is made to register a new entry of "source C" in the first search table 2, the collision occurs due to existence of the left index, so that the new address is automatically registered in the second search table 3.

If the entry of "source C" is completely deleted from the first search table 2, the collision does not occur at the time of registration of new "source C", with the result that the new entry is registered in the first search table 2. Then, there occurs inconvenience that the new registration overlaps with the content that has already been registered in the second search table 3. Thus, for the entry of "source C" that has undergone the collision, the entry is not completely deleted but the hash value of the index is left in order to intentionally cause the collision.

Processing concerning address search and packet transfer in the packet processing device 10 will be described along a flowchart of FIG. 4.

When receiving as an input a packet to be transferred from the router device 9 (FIG. 1) (step A101), the packet processing device 10 recognizes a source address from the header of the packet. Then, the packet processing device 10 uses the recognized source address to simultaneously search the first search table 2 and second search table 3 (step A102).

More concretely, in the search using the first search table 2, the hash value of the source address of the transfer packet is calculated, and a destination address is searched for using the hash value as a key. In the search using the second search table 3, the source address of a transfer packet is directly input to a CAM (associative memory), and respective bits of the source address are simultaneously subjected to matching processing. From the matching result, the destination address is identified.

As described above, a destination address paired with a given source address is registered in one of the first search table 2 and the second search table 3. This configuration allows parallel search of the first search table 2 and the second search table 3. Accordingly, when the source of a transfer packet has previously been registered, the destination address can be detected from one of the tables (2 and 3).

By performing search of the first search table 2 and the second search table 3 in parallel as described above, it is possible to prevent a decrease in the throughput of the packet processing device 10 at packet transfer time.

In the case where detection of the destination address has been successfully completed as a result of the search (Yes in step A103), the packet processing device 10 sets the detected destination address in the header of the transfer packet and transfers the resultant packet to the router device 8 (FIG. 1) (step A104). In the case where the detection has failed (No in step A103), that is, in the case where the destination address has not been detected from any of the tables (2 and 3), the packet processing device 10 discards the packet (step A105).

As described above, the packet processing device 10 of the present exemplary embodiment performs control such that the combination of source/destination is registered in one of the first search table 2 and the second search table 3. The entry that undergoes the collision in the first search table 2 is controlled to be registered in the second search table 3 constructed using the CAM. The first search table 2 and the second search table 3 are searched in parallel. With the above configuration, it is possible to prevent a decrease in the throughput of the packet processing device 10 at packet transfer time.

Further, all the addresses to be registered are not registered in the second search table 3, but only ones that undergone the collision in the first search table 2 are registered therein. Thus, an increase in the size of the CAM used for constructing the second search table 3 can be prevented, thereby enabling a reduction in the size of the packet processing device 10 and power saving in the packet processing device 10.

The present invention is not limited to the above exemplary embodiment and can be embodied in various modifications within the scope of the appended claims. For example, although the second search table 3 is constructed using the CAM (associative memory) in the above exemplary embodiment, the second search table 3 may be a two-dimensional search table constructed using a general-purpose memory (RAM) as hardware.

As the two-dimensional search technique, a technique called "Hi-Cuts (Hierarchical Intelligent Cuttings)" disclosed in, e.g., NPL 1 may be employed. The search using the hash table (2) is one-dimensional search, while the search using the "Hi-Cuts" is two-dimensional search. The "Hi-Cuts" is a kind of a decision tree method and follows the following procedure.

A given field (dimension) is divided into a plurality of areas, and setting is made such that the number of rules contained in each of the areas is not more than a threshold value (parameter: binth). Then, linear search of the rules is performed for the area in which the number of rules is not more than the threshold value binth.

Further, the maximum value is set for the number of divisions of the area. In the case where there exists the number of rules that exceeds the threshold value binth in a given area even if the original region is divided into the maximum number of areas, another field (dimension) is subjected to area division. Then, the area division and field selection are performed so that the number of rules in each area is not more than the threshold value. At this time, the filed that has once been selected may be selected once again for subdivision. Further, the same rule may appear in a plurality of areas.

Although the hash function is used as a one-way function for calculating the index value, another one-way function may be used.

Although the combination of the header information and destination address is the combination of the packet source address (starting point) and destination address (arrival point) in the above exemplary embodiment, the combination may be, e.g., a combination of a packet transmission destination (arrival point) and a transfer destination (relay point).

The present invention may be embodied as a computer program corresponding to the operation procedure of the packet processing device (10) and a recording medium storing the program.

The invention claimed is:

1. An address search method comprising:
    preparing a first search table in which an entry including an index value and a destination address is registered and a second search table in which a combination of header information and a destination address is registered;
    inputting a combination of header information and a destination address to be registered;
    calculating an index value by one-way function calculation using the input header information;
    registering, when the calculated index value is different from the index value of an existing entry in the first search table, the calculated index value and the input destination address in the first search table as a new entry;
    registering, when the calculated index value is the same as the index value of the existing entry, a combination of the header information and the destination address represented by the existing entry together with a combination of the input header information and the destination address in the second search table and deleting the destination address of the existing entry; and searching, upon reception of a packet to be transferred, the first and the second search tables in parallel for the destination address of the packet by using the header information of the packet, wherein the destination address of the packet is searched from the first search table by using, as a key, an index value calculated by using the header information of the packet and is searched from the second search table by using the header information of the packet.

2. The address search method according to claim 1, wherein
the second search table is constructed on a memory device including an associative memory.

3. The address search method according to claim 1, wherein
the second search table is a table for performing a two-dimensional search.

4. The address search method according to claim 1, wherein
the one-way function calculation is a hash function calculation.

5. The address search method according to claim 1, wherein
the header information is a source address of a packet.

6. The address search method according to claim 1, further comprising transmitting the packet to a destination address obtained by the parallel search.

7. A packet processing device comprising:
a first search table in which an entry including an index value and a destination address is registered;
a second search table in which a combination of header information and a destination address is registered;
a packet reception section that receives a packet to be transferred;
a registration section that receives as an input a combination of header information and a destination address to be registered, calculates an index value by one-way function calculation using the input header information, registers the calculated index value and the input destination address in the first search table as a new entry when the calculated index value is different from the index value of an existing entry in the first search table, and registers a combination of the header information and the destination address represented by the existing entry together with a combination of the input header information and the destination address in the second search table and deletes the destination address of the existing entry when the calculated index value is the same as the index value of the existing entry; and a search section that searches, upon reception of the packet to be transferred, the first and the second search tables in parallel for the destination address of the packet by using the header information of the packet, wherein the destination address of the packet is searched from the first search table by using, as a key, an index value calculated by using the header information of the packet and is searched from the second search table by using the header information of the packet.

8. The packet processing device according to claim 7, wherein
the second search table is constructed on a memory device including an associative memory.

9. The packet processing device according to claim 7, wherein the second search table is a table for performing a two-dimensional search.

10. The packet processing device according to claim 7, wherein
the one-way function calculation is a hash function calculation.

11. The packet processing device according to claim 7, wherein
the header information is a source address of a packet.

12. The packet processing device according to claim 7, further comprising a packet transmission section that transmits the packet to a destination address obtained by the search.

* * * * *